May 7, 1968　　F. HRIBAR, JR., ET AL　　3,381,710
VALVE ASSEMBLY
Filed Nov. 23, 1964　　4 Sheets-Sheet 1

INVENTORS.
FRANK HRIBAR, JR.
WAYLAND A. TENKKU
BY
Oberlin, Maky & Donnelly
ATTORNEYS

United States Patent Office 3,381,710
Patented May 7, 1968

3,381,710
VALVE ASSEMBLY
Frank Hribar, Jr., Kirtland, and Wayland A. Tenkku,
Mentor, Ohio, assignors to Fluid Regulators Corp.,
Painesville, Ohio, a corporation of Ohio
Filed Nov. 23, 1964, Ser. No. 413,015
22 Claims. (Cl. 137—596.13)

ABSTRACT OF THE DISCLOSURE

A valve assembly for controlling the actuation of a thrust reverser assembly and the like, including a pair of manual valves selectively operative to direct low pressure fluid against the piston of a slave valve, direct high pressure fluid against such piston, or cut off fluid flow thereto altogether; a bypass valve and solenoid valve in series for controlling the amount of pressure available to the ports of the slave valve and actuator assembly; and a lockout lever for precluding accidental movement of the thrust reverser assembly during flight.

Disclosure

This invention relates generally, as indicated, to a valve assembly and, more particularly, to a valve assembly for actuating a thrust reverser assembly for jet engines and the like.

The landing speeds of jet planes are quite high, so high in fact that extremely long landing strips and large heavy duty brakes are required to bring such planes to a safe stop. For aiding in slowing down jet planes once they touch the ground, thrust reverser assemblies have been devised, which convert the engine power into a braking force, thus reducing the amount of wear on the brakes and allowing the planes to land on shorter landing strips. Thrust reverser assemblies generally consist of a pair of doors pivotally mounted adjacent the rear of each jet engine for outward swinging movement from a faired position in engagement with the engines. When the doors are swung out, a portion of the exhaust and fan air from the jet engines is diverted in the opposite direction to act as a braking force. Through the use of such thrust reverser assemblies, as much as 45 percent of the engine power can be converted to a braking force.

A principal object of this invention is to provide a novel valve assembly for effectively and accurately controlling the actuation of such thrust reverser assemblies and the like.

It is another object to provide such a valve assembly which is of simple and efficient form having a unitary housing with a plurality of fluid ports in one face thereof and a plurality of parallel valve bores in several of the other faces in which there are removably mounted valves for controlling the flow of fluid into and out of such fluid ports, thus providing an extremely compact assembly.

It is still a further object to provide a valve assembly of the character indicated above with a lockout lever for precluding accidental movement of the thrust reverser assembly doors to the outward position during flight.

Yet another object is to provide a valve assembly with a pair of manual valves which, when actuated in a desired manner by means of a cam member, are operative to do one of three things; direct low pressure fluid against the piston of a slave valve; direct high pressure fluid against such piston; or cut off fluid flow thereto altogether.

Still another object is to provide a bypass valve and solenoid valve in series for controlling the amount of pressure available to the ports of the slave valves and actuator assembly.

Another object is to provide a flow regulator in the drain passage for controlling the amount of fluid flowing to the cooler port of the valve assembly.

Another object is to provide a pressure switch in fluid communication with the high pressure passage of the slave valve for indicating to the pilot when sufficient pressure is available to operate the actuator of the thrust reverser assembly in either direction.

A further object is to provide a valve assembly with a check valve in the fluid passage leading to the manual valves to prevent a momentary drop in the pressure when acting on the piston of the slave valve should the doors of the thrust reverser assembly run away from the pump capacity during their outward swinging movement.

Yet another object is to provide such a valve assembly with a relief valve for limiting the maximum pressure in the system by opening the bypass valve to drain.

A further object is to provide a valve assembly with a check valve to prevent flow of fluid from a bypass valve to the slave valve.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invetnion, this being indicative, however, of but one of the various ways in which the principle of the invention may be employed.

Referring now more particularly to the drawings, the preferred form of valve assembly 1 is shown in FIGS. 1–4 as comprising a unitary valve housing 2 having a plurality of mounting holes 3 for mounting the assembly in place. On the rear face 4 of the valve assembly 1 there are provided a plurality of ports 5, 6, 7, 8, and 9, port 5 being a pressure inlet port into which fluid is pumped from a pump (not shown); port 6 being an outlet or tank port for the discharge of fluid from the valve assembly to a reservoir or tank (not shown); port 7 being an outlet port for discharging fluid to a cooler, also not shown, but which is in turn connected to the reservoir; and ports 8 and 9 being service or actuator ports for directing the fluid to and from a reverse thrust assembly actuator in a manner which will be fully discussed hereafter.

Figures 4, 5, 6, 7, 8:
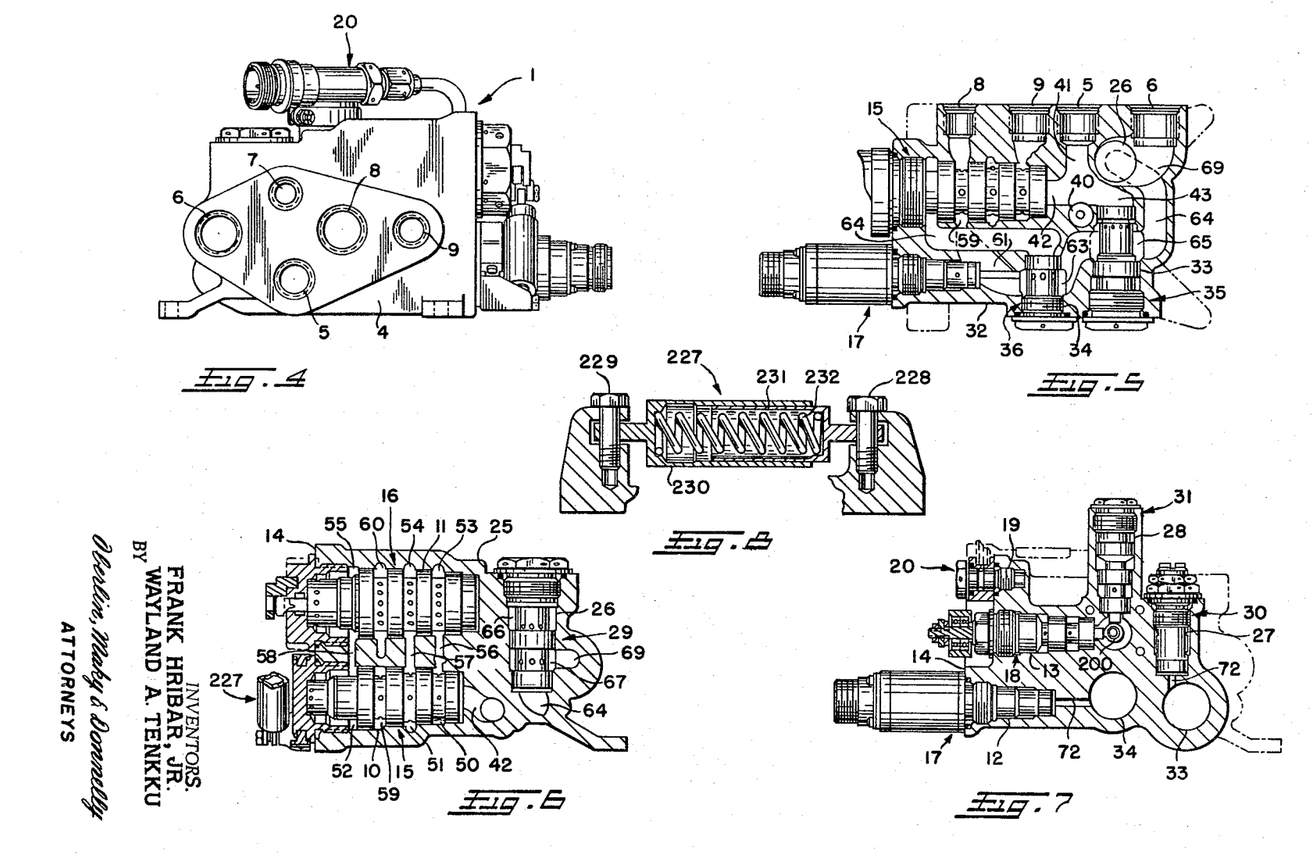
FIG. 4 is a rear elevation of such valve assembly.
FIG. 5 is a substantially horizontal section taken on the plane of the line 5—5 of FIG. 1 which contains the axes of the pressurizing valve, the bypass valve, the check valve for preventing flow from the bypass valve to the slave valve, the solenoid valve, the inlet and outlet ports, and the actuator ports.
FIG. 6 is a substantially vertical section taken on the plane of the line 6—6 of FIG. 2 which contains the axes of the pressurizing valve, the slave valve, and the flow regulator.
FIG. 7 is a vertical section taken on the plane of the line 7—7 of FIG. 2 which contains the axes of the solenoid valve, the manual valves, and the relief valve.
FIG. 8 is a fragmentary section taken on the plane of the line 8—8 of FIG. 2 showing the construction of the lockout lever return spring.

As perhaps best seen in FIGS. 6 and 7, four parallel valve bores 10, 11, 12, and 13 are provided in one of the end faces 14 of the housing 2 in which there are mounted a pressurizing valve 15, slave valve 16, solenoid valve 17, and manual valve 18, respectively. Also provided in end face 14 of the housing 2 is a pressure switch assembly bore 19 (see FIG. 7) for receiving a pressure switch assembly 20.

In the top face 25 of the housing 2 there are provided three bores 26, 27, and 28 for receiving a flow regulator 29, relief valve 30, and manual valve 31, respectively, also clearly shown in FIGS. 6 and 7, while in the front face 32 there are provided two additional parallel valve bores 33 and 34 for receiving a bypass valve 35 and check valve 36 (see FIG. 5).

The inlet port 5 is interconnected with the manual valve bore 28 via a check valve bore 40 by means of a fluid passage 41, such fluid passage 41 also having a pair of branch passages 42 and 43 intersecting the bottom of pressurizing valve bore 10 and bypass valve bore 33, respectively. The check valve bore 40 extends into the housing 2 from the top face 25 and has a check valve 44 (FIG. 3) disposed therein.

The pressurizing valve bore 10 is formed with three longitudinally spaced service ports 50, 51, and 52 which are interconnected with longitudinally spaced service ports 53, 54, and 55 formed in slave valve bore 11 by means of fluid passageways 56, 57, and 58, respectively. Annular service ports 59 and 60 are also provided in bores 10 and 11, respectively, port 59 being in fluid communication with a drain passageway 61 and port 60 being in fluid communication with actuator port 9 via passage 62 (see FIG. 9).

Drain passageway 61 intersects annular chamber 63 in check valve bore 34, where it communicates with drain passage 64. Drain passage 64 in turn interconnects passageway 58 between bores 10 and 11 with flow regulator bore 26 via check valve bore 34, annular chamber 63, and annular chamber 65 in bypass valve bore 33. Flow regulator bore 26 has a pair of annular grooves 66 and 67, groove 66 communicating with cooler port 7 via passage 68 and groove 67 communicating with tank port 6 via passage 69.

Drain passage 64 is provided with a branch passage 70 between bypass valve bore 33 and flow regulator bore 26 which communicates with annular port 71 in relief valve bore 27. A branch passage 72 is also provided which intersects the bottom of relief valve bore 27, annular groove 73 of bypass valve bore 33, solenoid valve bore 12, and annular chamber 63 of check valve bore 34.

The bottom of slave valve bore 11 is in fluid communication with drain passage 64 via branch passage 80, longitudinally spaced ports 81 and 82 in manual valve bore 13, passage 83, annular port 84 in manual valve bore 28, and passage 85. Further, the high pressure passage 57 between bores 10 and 11 communicates with the bottom of pressure switch bore 19 by means of a branch passage 86.

Figures 9, 10:
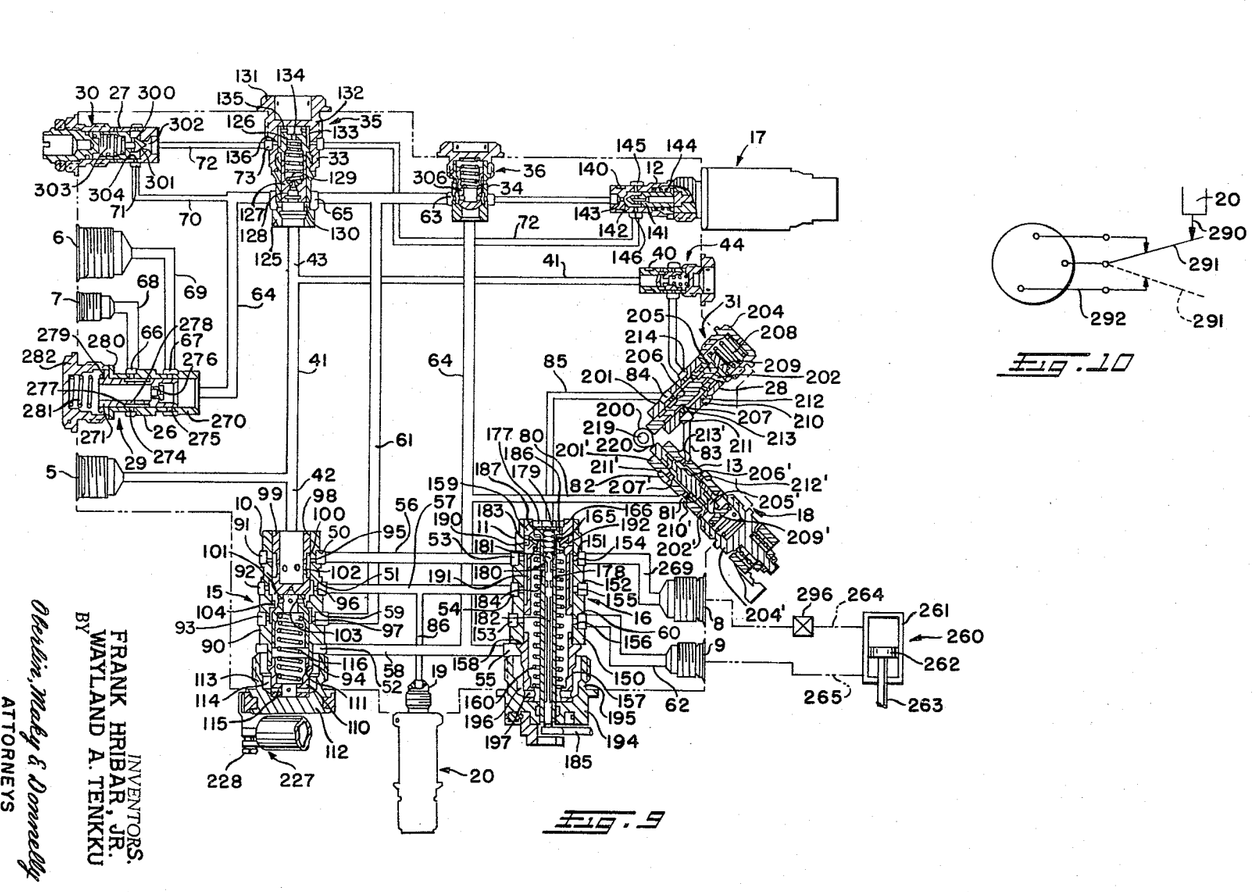
FIG. 9 is a schematic flow diagram of the valve assembly showing in detail the structure of the various valves in the system and the fluid connections between such valves.
FIG. 10 is a schematic diagram of an electrical indicating circuit which is adapted to be actuated by the pressure switch.
Figure 11:
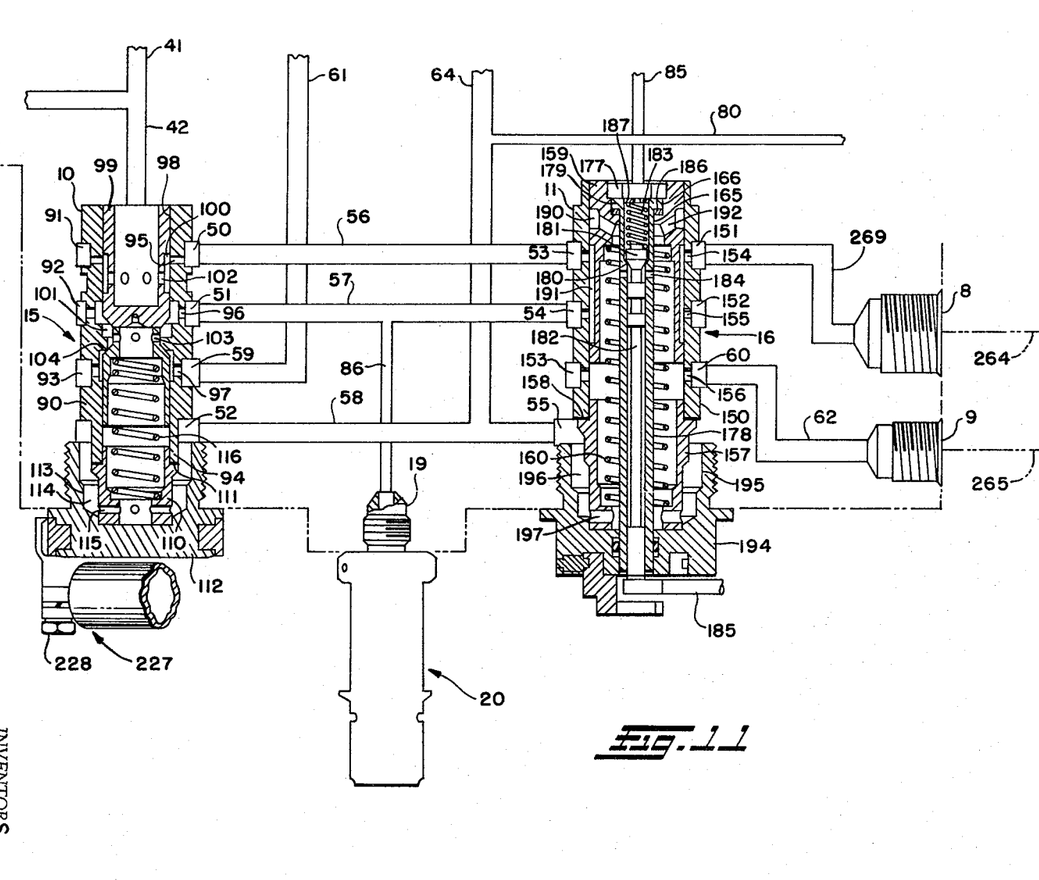
FIG. 11 is an enlarged fragmentary schematic diagram of the pressurizing valve and slave valve with fluid connections as seen in FIG. 9.

The construction of the various valves in the assembly is shown in detail in FIG. 9. Referring first to the pressurizing valve 15, such valve includes a hollow sleeve 90 formed with three longitudinally spaced grooves 91, 92, and 93 disposed adjacent the ports 50, 51, and 59, respectively, and a reduced end portion 94 adjacent the port 52. Three circumferential series of radial passages or apertures 95, 96, and 97 extend through the sleeve 90 to establish fluid communication between the grooves 91, 92, and 93, respectively, and the interior of the sleeve 90.

Disposed within the sleeve bore 98 for reciprocating movement therein is a valve plunger 99 having a pair of longitudinally spaced annular grooves 100 and 101 and two circumferential series of radial apertures 102 and 103 intersecting such grooves and the interior of the valve plunger 99. The inner surface of the sleeve 90 is provided with a narrow annular shoulder 104 the lower edge of which is adapted to be engaged by and form a seal with the lower tapered edge of the groove 101 when the plunger 99 is in the up position, and the upper edge of which is adapted to be engaged by and form a seal with the upper tapered edge of the groove 101 when the plunger 99 is in the down position.

Within the end portion 94 there is disposed a hollow sleeve member 110 having a shoulder 111 engaging the end of sleeve 90. Threadedly engaging the bore 10 adjacent the outer end thereof is a cap member or plug 112, the side walls 113 of which are laterally spaced from the sleeve member 110 to form an annular passage 114 for establishing fluid communication between port 52 and the interior of plunger 99 via radial apertures 115 in the lower end of sleeve 110. The valve plunger 99 is yieldably held in the up position shown in FIG. 9 by means of a spring 116 disposed within sleeve 110. As is readily apparent, when the plunger 99 is in such up position, fluid in inlet passage 41 is directed to port 53 of slave valve bore 11 through branch passage 42, radial apertures 102, groove 100, radial apertures 95, groove 91, port 50, and passage 56. Should the fluid pressure in passage 41 be allowed to increase, the pressure drop through apertures 102 of plunged 99 will eventually become sufficient to overcome the force exerted by spring 116 and urge the valve plunger 99 to the down position, cutting off fluid communication between inlet passage 41 and passage 56 and establishing fluid communication between inlet passage 42 and passage 57 through apertures 102, groove 100, apertures 96, groove 92, and port 51. The maximum extent of downward movement of valve plunger 99 is limited by engagement of the upper edge of the groove 101 with the upper edge of the annular shoulder 104.

The amount of pressure in passage 41 is controlled by the bypass valve 35 and solenoid valve 17. The bypass valve 35 consists of a first hollow sleeve member 125 in the outer end of which there is disposed a second hollow sleeve member 126. Slidably received within sleeve member 125 is a piston 127 having a restricted longitudinally extending orifice 128 therein. A spring 129 is disposed between sleeve member 126 and piston 127 for yieldingly urging the latter in a direction to close fluid communication between inlet passage 41 and drain passage 64 through radial apertures 130 in sleeve member 125 and port 65. A cap member 131 threadedly engages the upper end of bypass valve bore 33 for retaining the sleeve members 125 and 126 in position. Further, side walls 132 of the cap member 131 are laterally spaced from sleeve member 125 to establish therewith an annular passageway 133. The sleeve member 126 is provided with a longitudinal opening 134 and radial apertures 135, while the side walls 132 are provided with radial apertures 136 which intersect annular passageway 133 and groove 73. Thus, a fluid path is provided between inlet passage 41 and passage 72 through bypass valve 35 via restricted orifice 128, opening 134, radial apertures 135, annular passageway 133, apertures 136, and groove 73.

Referring now to solenoid valve 17, such valve consists of a hollow sleeve member 140 in which there is disposed a needle valve 141 normally urged to the right as viewed in FIG. 9 away from seat 142 in longitudinal aperture 143 by means of a spring 144. With the needle valve 141 away from its seat 142, fluid in passage 72 is allowed to pass through solenoid valve 17 via annular port 145, radial passages 146, and longitudinal aperture 143 into annular chamber 63 of check valve bore 34. However, when the armature of solenoid valve 17 is energized by a relay (not shown), the needle valve 141 is forced to the left against the seat 142 to cut off fluid flow therethrough.

It can now be seen that when the solenoid valve 17 is in the unenergized position shown in FIG. 9, fluid from inlet passage 41 will flow to drain passage 64 through by-chember 63. Thus, as the pressure in inlet port 41 increases, the pressure drop across restricted orifice 128 of bypass valve 35 also increases until piston 127 is finally forced outwardly away from apertures 130 against the bias of spring 129, thus dumping the fluid in inlet passage 41 directly into drain passage 61 through apertures 130 and port 65, which precludes further buildup in pressure in supply passage 41.

When solenoid valve 17 is energized, on the other hand, fluid can no longer pass through restricted orifice 128 of bypass valve 35, since the flow through aperture 143 of solenoid valve 17 is blocked by needle valve 141. Accordingly, the pressure on both sides of restricted orifice 128 will remain the same and, therefore, the piston 127 will not be urged to uncover apertures 130 to establish direct fluid communication between inlet passage 41 and drain passage 61. Thus, fluid pressure will be allowed to build up in inlet passage 41 until there is sufficient pressure to urge valve plunger 99 of pressurizing valve 15 downwardly against the bias of spring 116, thus cutting off fluid communication between inlet passage 41 and passage 56, but establishing fluid communication between passage 41 and passage 57 via radial apertures 102, groove 100, radial apertures 96, groove 92, and annular port 51.

As aforesaid, fluid passages 56, 57, and 58 communicate with ports 53, 54, and 55, respectively, in slave valve bore 11. Mounted in bore 11 is a slave valve 16 which consists of a sleeve member 150 formed with longitudinally spaced grooves 151, 152, and 153 through which there are provided radial apertures 154, 155, and 156 for communicating the interior of such sleeve 150 with annular ports 53, 54, and 55. Within the sleeve 150 adjacent the outer end thereof is a sleeve member 157 having an annular shoulder 158 engaging the outer end of such sleeve 150.

A piston 159 is disposed within the sleeve 150 for reciprocating movement therein, such piston 159 being spring biased in the up position shown in FIG. 9 by means of a spring 160. The piston 159 has a longitudinal bore 165 with a countersunk portion 166 for receiving the head 179 of a hollow sleeve 178, such head 179 being held in place by means of a nut 177 threadedly engaging the walls of the countersunk portion 166. A seat 180 is provided in the hollow sleeve 178 for receiving the head portion 181 of a poppet valve 182 disposed therein. The head portion 181 is yieldingly urged into engagement with the seat 180 by means of a spring 183 disposed between such head portion and a washer 187 on the nut 177. A plurality of radial apertures 184 are provided in the hollow sleeve 178 directly below the seat 180.

A lockout lever 185 may be inserted adjacent the lower end of poppet valve 182 for precluding downward movement thereof, but not precluding downward movement of the hollow sleeve 178 and piston 159. A gasket 186 is provided between the bottom of the counterbore 166 and the adjacent head surface of the hollow sleeve 178.

The piston 159 is provided with two spaced annular grooves 190 and 191 and a plurality of generally radial apertures 192 which communicate groove 190 with the interior of such piston 159. A cap member 194 threadedly engages the outer end of slave valve bore 11 for retaining the various elements of the slave valve 16 in position. The side walls 195 of the cap member 194 are laterally spaced from the sleeve member 157 to provide a fluid path 196 between annular port 55 and the interior of such sleeve member 157 through radial apertures 197.

Either the drain pressure in drain passage 64 or the inlet pressure in inlet passage 41 may be directed against the piston 159 of slave valve 16 through the actuation of the manual valves 18 and 31 by means of a cam 200.

The manual valve 31 consists of a hollow sleeve 201 in which there is disposed a sleeve 202. Such sleeves 201 and 202 are held within the valve bore 28 by means of a hollow cap member 204 threadedly engaging such bore 28. A piston 205 having a tapered shoulder 206 for engaging a seat 207 in the sleeve 201 is disposed in such sleeve 201, the inner end of the piston 205 extending inwardly beyond the inner end of the sleeve 201 to a position adjacent the cam 200. The piston 205 is urged to the closed position by a spring 208 and spring follower 209 disposed in the cap member 204. The sleeve 201 has two annular grooves 210 and 211 through which there extends radial apertures 212 and 213, respectively, for communicating the interior of such sleeve 201 with annular ports 214 and 84.

The construction and operation of manual valve 18 is substantially identical to that of manual valve 31, and, therefore, like reference numerals followed by a prime (') have been used to designate like parts.

The cam 200 is mounted on a cam shaft 219 for rotational movement and has a projection 220 thereon which, when moved to engage the inner end of the piston 205 or 205', urges the piston away from its respective seat 207 or 207' to the open position. As is readily apparent, when the manual valve 18 is opened by the projection 220 on cam 200, the manual valve 31 is closed and vice versa. Further, when the projection 220 is disposed between the two pistons 205 and 205' in what may be termed the "Dead" position, both valves 18 and 31 are closed.

When valve 18 is open and valve 31 is closed, return or drain pressure from drain passage 64 is directed against piston 159 of slave valve 16 through branch passage 80, annular ports 81 and 82, branch passage 83, and port 84, and branch passage 85. Conversely, when valve 31 is open and valve 18 is closed, inlet pressure from inlet passage 41 is directed against piston 159 of slave valve 16 through annular chambers 214 and 84, and branch passage 85. However, when both valves 18 and 31 are closed, neither return pressure from drain passage 64 nor inlet pressure from inlet passage 41 is directed against piston 159.

Figure 2:
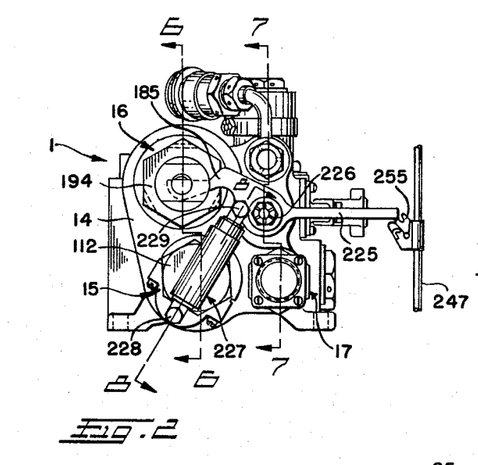
FIG. 2 is an end elevation of such valve assembly as viewed from the left hand end of FIG. 1.
Figure 3:
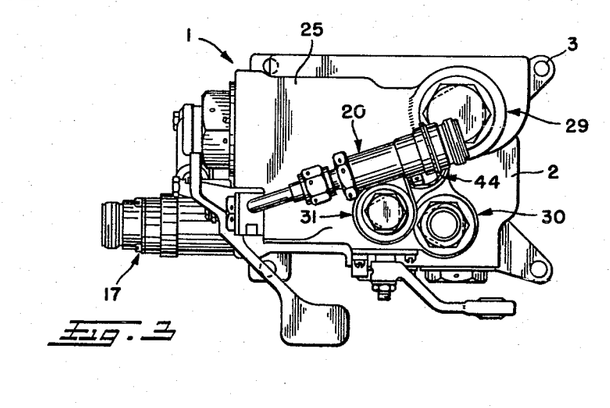
FIG. 3 is a top plan of the valve assembly of FIG. 1.

The lockout lever 185 may be moved into and out of the locking position shown in FIGS. 2 and 9 by rotational movement of its lever arm 225 about pivot 226 on the end face 14 of the valve assembly 1. Movement of the lockout lever 185 out of locking position is accomplished by moving the lever arm 225 in a counter-clockwise direction as shown in FIG. 2. Preferably, a spring assembly 227 having one end pivotally mounted at 228 on the cap member 112 of pressurizing valve 15 and the other end pivotally mounted at 229 on the lockout lever 185 to the left of pivot 226 is provided for yieldingly urging the lockout lever 185 to the lockout position. The construction of the spring assembly 227 is clearly shown in FIG. 8 as consisting of a housing 230 in which there is slidably received a piston 231. Disposed between the ends of the housing 230 and piston 231 is a compression spring 232. While the strength and location of the spring assembly 227 may be varied as desired, it is preferable that the strength of spring 232 and the location of the spring assembly 227 on the lockout lever 185 and housing 2 as well as the length of lever arm 225 be such that a three pound maximum force exerted on the end of arm 225 will move the lockout lever 185 to the unlocking position. Further, the strength of the spring 232 as well as the location and effective lengths of the above-noted elements are preferably such that when the lever 185 has been moved to the fully unlocked position, a maximum force of only one pound will maintain the lockout lever 185 in such unlocked position.

Figure 1:
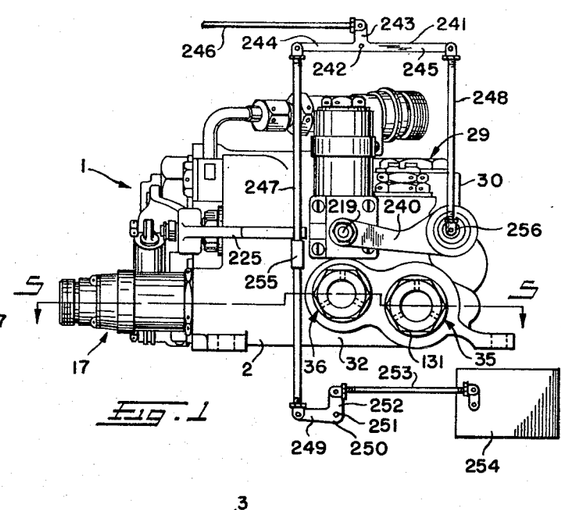
FIG. 1 is a front elevation of the preferred form of novel valve assembly constructed in accordance with the present invention.

A suitable linkage arrangement for actuating the lever arm 225 of lockout lever 185 and cam shaft lever 240 secured to cam shaft 219 is shown in FIGS. 1 and 2. The linkage arrangement consists of a bell crank 241 supported for pivotal movement about pivot 242 on a support, not shown. The bell crank 241 has three outwardly projecting arm portions 243, 244 and 245 on the outer ends of which there are pivotally mounted rods 246, 247, and 248, respectively. Rods 247 and 248 are adapted to extend downwardly, the lower end of rod 247 being connected to one arm 249 of a bell crank 250 pivotally mounted at 251. Mounted on the second arm 252 of the bell crank 250 is a horizontally disposed rod 253, the other end of which is secured to a fuel control valve 254 for a jet engine and the like. Secured to the rod 247 between the ends thereof is a fork-shaped member 255 which is adapted to engage the outer end of lever arm 225 when such rod 247 is moved upwardly. The lower end of rod 248 is connected at 256 to the outer end of cam lever 240.

The rod 246 extends in a horizontal direction to a position where it may be readily reciprocated back and forth by the pilot. When the rod 246 is moved to the right as viewed in FIG. 1, the bell crank 241 is rotated in a clockwise direction to force rod 248 downwardly, rod 247 upwardly, and rod 253 to the right. Downward movement of rod 248 rotates the projection 220 of cam 200 through cam shaft 219 and cam lever 240 from what may be termed the "Forward" position shown in FIG. 9, with manual valve 31 closed and manual valve 18 open, to the "Reverse" position, with manual valve 31 open and manual valve 18 closed.

Upward movement of rod 247 moves lever arm 225 and thus lockout lever 185 in a counterclockwise direction to the unlocking position, while movement of rod 253 to the right increases the flow of fuel through valve 254 to the jet engine.

Movement of the horizontal rod 246 back toward the left causes the reverse of the movements described above; i.e., rod 247 is moved downwardly to allow spring 232 of spring assembly 227 to return the lockout lever 185 to its lockout position; rod 248 is moved upwardly to move cam 200 back to the "Forward" position; and rod 253 is moved to the left to decrease the flow of fuel through valve 254.

Although the valve assembly 1 may have other uses, such valve assembly, as aforesaid, has particular utility in controlling the actuation of a thrust reverser assembly for jet engines. An actuator 260 for actuating the doors of such a thrust reverser assembly is shown in FIG. 9. The actuator 260 consists of a cylinder 261 in which there is disposed a piston 262 having a rod 263 which is adapted to be connected to the thrust reverser assembly doors by a suitable linkage (not shown). The head end of the cylinder 261 is in fluid communication with port 8 of valve assembly 1 through line 264, while the rod end is in fluid communication with port 9 of valve assembly 1 through line 265.

*Operation*

In the normal flight condition, the various valves of the valve assembly 1 are maintained in the position shown in FIG. 9 with the lockout lever 185 in lockout position, the manual valves 18 and 31 in the "Forward" position (manual valve 18 being open and manual valve 31 being closed), and the solenoid valve 17 deenergized to maintain the piston 262 of the actuator 260 in the extended position to keep the thrust reverser assembly doors in the swung-in or faired position. Thus, the fluid in inlet passage 41 passes through pressurizing valve 15 via apertures 102, groove 100, apertures 95, groove 91, and annular port 50 into passageway 56 and then through slave valve 16 via port 53, apertures 154, groove 191, apertures 155, groove 152, and annular port 54 into passageway 57. From passageway 57, the fluid passes back again through pressurizing valve 15 via port 51, groove 92, apertures 96, apertures 103, apertures 115, annular chamber 114, and port 52 into passageway 58 which is in fluid communication with drain passage 64. The fluid in passageway 56 will also enter the head end of actuator 260 to maintain the piston 262 in the extended position, as shown, via port 53, passageway 269, actuator port 8, and flow line 264. Since the actuator 260 is generally disposed in a high temperature area adjacent the jet engines of a plane, the actuator requires approximately one gallon per minute cooling flow to maintain its temperature at the desired level. This cooling flow is permitted to pass through the actuator via a restriction therein (not shown) from the flow line 264 to the flow line 265 and return to the slave valve 16 via service port 9.

Fluid in inlet passage 41 also passes to drain passage 64 through bypass valve 35 via restricted orifice 128, apertures 134 and 135, annular chamber 133, radial apertures 136, and port 73 into passage 72 and through solenoid valve 17 via port 145, radial apertures 146, and longitudinal aperture 143. The fluid in drain passage 64 then proceeds to either the outlet port 6 or cooler port 7 via flow regulator 29. The flow regulator 29 consists of a cylinder 270 in which there is slidably received a piston 271. Extending through the wall of cylinder 270 adjacent the annular ports 66 and 67 are two circumferential series of radial apertures 274 and 275, respectively. The piston 271 is hollow, but has a centrally disposed restricted orifice 276 adjacent the inner end thereof and an annular groove 277 and radial apertures 278 intersecting such groove and the interior of the piston 271. The outer end of the piston 271 has an annular flange 279 which is adapted to engage a shoulder 280 of the cylinder 270 when the piston 271 is urged axially inwardly by a spring 281 disposed between the annular flange 279 and a cap member 282 threadedly engaging the outer end of flow regulator bore 26. With the piston 271 in such inward position, fluid communication is established between drain passage 64 and cooler port 7 via restricted orifice 276, radial apertures 278, groove 277, radical apertures 274, port 66, and flow line 68. However, fluid communication between drain passage 64 and outlet port 6 is blocked by the inner end of the piston 271 covering apertures 275 which are in fluid communication with port 67 and flow line 69. Accordingly, until the fluid pressure drop across restricted orifice 276 is sufficient to overcome the bias of the spring 281, all of the fluid in drain passage 64 will pass through flow regulator 29 into cooler port 7. While the capacity of orifice 276 may be varied as desired, it has been found that approximately 2 gallons per minute of drain fluid flowing to the cooler will be adequate to maintain the temperature of the fluid at the desired operating level. Of course, the fluid which enters the cooler is subsequently directed to the reservoir for its return flow to the system through inlet port 5.

When the flow in drain passage 64 exceeds two gallons per minute, the pressure drop through restricted orifice 276 will be sufficient to force the piston 271 outwardly against the bias of the spring 281, thus exposing apertures 275 and establishing fluid communication between drain passage 64 and outlet port 6 via such apertures 275, port 67, and flow line 69 to take care of the fluid in drain passage 64 in excess of two gallons per minute.

The pressure in inlet passage 41 is precluded from increasing to the extent necessary to move the valve plunger 99 of pressurizing valve 15 outwardly against the bias of spring 116 by the bypass valve 35 and solenoid valve 17, since an increase in pressure in inlet passage 41 will force piston 127 of bypass valve 35 outwardly against the bias of spring 129 to expose apertures 130, through which the fluid in inlet passage 41 is dumped directly into drain passage 64 via port 65, when solenoid valve 17 is in the deenergized position.

With the lockout lever 185 in lockout position as aforesaid, the poppet valve 182 of slave valve 16 is held against its seat 180 due to the force exerted thereagainst by spring 183. However, should a failure in the system occur, either electrical or mechanical, so that pressure is exerted on the piston 159, the piston 159 as well as the hollow sleeve 178 and poppet valve 182 will move outwardly until such poppet valve 182 contacts the lockout arm 185. When this occurs, further outward movement of the poppet valve 182 is precluded. Therefore, continued outward movement of the piston 159 and hollow sleeve 178 will cause the seat 180 to move away from the poppet valve 182 and allow fluid to flow through the piston 159 to the drain passage 64 via radial passages 184 and 197, annular chamber 196, and port 55, thus reducing the fluid pressure at the inner end of piston 159 and preventing further movement thereof.

It should now be readily apparent that when the lockout lever 185 is in the lockout position, the pressure adjacent the inner end of position 159 is precluded from building up sufficiently to move such piston 159 outwardly against the bias of spring 160 a distance sufficient to establish fluid communication between the high pressure passage 57 and port 60, even though there may be an electrical or mechanical failure in the system. Thus, the actuator 260 cannot accidentally be actuated during flight with the solenoid valve 17 open and lockout lever 185 in the lockout position, since, first of all, high pressure fluid is precluded from developing in the system and, secondly, fluid communication between the high pressure passage 57 and the rod end of the actuator 260 is blocked when the piston 159 of slave valve 16 is in the inward position. Only when the plane touches the ground is it desirable to swing the thrust reverser assembly doors outwardly to direct the exhaust and fan air from the jet engines in the opposite direction to convert the power of such jet engines to a braking force.

The valve assembly 1 is prepared for actuation of the actuator 260 by the pilot moving the actuating rod 246 to the right as viewed in FIG. 1 a sufficient distance to cause movement of the cam 200 from the "Forward" position to the "Reverse" position with the projection 220 in engagement with piston 205 of manual valve 31 to open the same, the spring-biased piston 205' thus being permitted to close manual valve 18. Such movement of the rod 246 simultaneously moves the lockout lever 185 to the unlock position and actuates a relay (not shown) for energizing the solenoid valve 17. When the solenoid valve 17 is energized, the needle valve 141 thereof is forced to the left as viewed in FIG. 9 against the seat 142 to preclude fluid flow therethrough from inlet passage 41 via bypass valve 35 and passage 72. In turn, fluid is precluded from flowing through restricted orifice 128 of bypass valve 35 and, therefore, the pressure on both sides of such restricted orifice is the same, regardless of the pressure in inlet passage 41. Accordingly, the pressure in line 41 is allowed to build up sufficiently to force valve plunger 99 of pressurizing valve 15 outwardly and establish fluid communication between inlet passage 41 and high pressure passage 57 via radial apertures 102, groove 100, radial apertures 96, and port 51.

The pressure switch 20, as aforesaid, is in fluid communication with the high pressure passage 57 via branch passage 86. As schematically shown in FIG. 10, the pressure switch 20 is provided with a plunger 290 which is adapted to engage and move a contact arm 291 from the solid line position to the phantom line position when the pressure in passage 57 is sufficient to operate the actuator 260 in either direction. When moved to the phantom line position, the contact arm 291 completes an electrical circuit 292 which indicates to the pilot that the desired pressure is available, as by lighting a lamp on the instrument panel of the plane, for example.

With manual valve 31 open, fluid communication is established between inlet passage 41 and the inner end of piston 159 of slave valve 16 via the spring-biased check valve 44 mounted in bore 40, the annular port 214, radial passages 212 and 213, port 84, and branch passage 85. The pressure exerted by such fluid against the piston 159 will cause the piston as well as the hollow sleeve 178 and poppet valve 182 to move outwardly against the bias of spring 160. With the lockout lever 185 in the unlock position as aforesaid, this outward movement of the poppet valve 182 will not be interfered with. Thus, the poppet valve 182 will be maintained in engagement with seat 180 of hollow sleeve 178 by spring 183 and the piston 159 will be urged outwardly by the fluid pressure adjacent the inner end thereof until such piston 159 engages the inner end of sleeve 157. With the piston 159 in the outward position, fluid communication is now established between high pressure passage 57 and the rod end of actuator 260 via port 54, radial apertures 155, groove 191, radial apertures 156, port 60, passage 62, actuator port 9, and flow line 265. Further, fluid communication is established between the head end of actuator 260 and drain passage 64 via flow line 264, actuator port 8, passageway 269, port 53, apertures 154, groove 190, apertures 192 and 197, annular chamber 196, and port 55.

While the amount of pressure and fluid flow necessary to retract the actuator 260 and thus swing the doors outwardly will vary depending upon a number of factors, such as the size of the actuator cylinder 261, the size of the doors, the ground speed of the airplane, etc., it has been found that a pressure of 1,500 p.s.i., a flow of 6½ gallons per minute into the rod end of the cylinder 261, and a discharge of 10 gallons per minute from the head end of the cylinder 261 will generally be sufficient to accomplish the above desired results.

Once the thrust reverser assembly doors are swung outwardly a portion of the way, the air currents flowing by the plane due to its relative speed with respect to the air will tend to force the doors the rest of the way out and thus tend to cause the actuator 260 to run away from the capacity of the pump. Should this happen, the pressure in inlet passage 41 will drop to such an extent that the piston 159 of slave valve 16 will be urged inwardly to the FIG. 9 position and thus cut off fluid communication between the high pressure passage 57 and the rod end of the actuator 260, except for the fact that the check valve 44 prevents reverse flow of fluid therethrough to inlet passage 41 from the inner end of the piston 159.

To preclude such rapid outward swinging movement of the doors once the force of the air currents come into play that the doors are damaged, a flow regulator 296 having a capacity of 10 gallons per minute is disposed in flow line 264 as shown to control the speed at which the actuator 260 is retracted.

At the end of the actuator stroke, the pressure in the system will build up. In order to prevent damage to the various parts of the valve assembly, a relief valve 30 is provided for establishing fluid communication between passages 72 and 70 when the fluid pressure in the system reaches a preselected level of, say, 3000 p.s.i. At such pressure level, the piston 300 of relief valve 30 will be urged outwardly away from seat 301 and longitudinal aperture 302 against the bias of spring 303 to allow fluid of up to, say ⅛ gallon per minute to flow from passageway 72 through such aperture 302 as well as through radial apertures 304 and port 71 into passage 70, which is in direct fluid communication with drain passage 64. When the flow through relief valve 30 reaches ⅛ gallon per minute, the pressure drop across orifice 128 of bypass valve 35 will be sufficient to urge the piston 127 outwardly to expose radial apertures 130, through which the fluid in inlet passage 41 will be dumped directly into drain passage 64 via port 65.

The check valve 36 has a spring biased piston 306 for preventing the flow of fluid from bypass valve 35 to enter slave valve 16 via drain passages 61 and 64.

To return the thrust reverser assembly doors to the faired or closed position, the pilot need only move the rod 246 back to the "Forward" position, thus causing cam 200 to open manual valve 18 and close manual valve 31, and allowing the bias of spring 232 to urge the lockout lever 185 back to the lockout position, the solenoid valve 17 remaining energized by a relay. With manual valve 31 closed and manual valve 18 open, the fluid adjacent the inner end of piston 159 is dumped to the drain passage 64 via passage 85, port 84, passage 83, port 82, radial apertures 213' and 212', port 81, and passageway 80, and the piston 159 is again forced to the inward position by the spring 160. Thus, the high pressure in line 57 is now in fluid communication with the head end of actuator 260 via port 54, radial apertures 155, groove 191, radial apertures 154, port 53, passageway 269, actuator port 8, and fluid line 264 to extend the piston 262 of the actuator 260 and swing the doors in, the rod end of such actuator 260 being dumped to drain via flow line 265, port 9, passageway 62, port 60, radial apertures 156 and 197, annular chamber 196, and port 55.

Again, once the actuator 260 reaches the end of its stroke, the relief valve 30 will limit the maximum pressure as before.

When the thrust reverser assembly doors are completely swung in, it is desirable that such doors actuate a switch (not shown) to actuate a relay for deenergizing the solenoid valve 17. Now the system is in its orignal state with the lockout lever 185 in position to preclude accidental movement of the doors to the out position during flight.

It can now be seen that the above-disclosed valve assembly provides a very safe and effective way of controlling the actuation of a thrust reverser assembly and the like. Not only can the thrust reverser doors be moved inwardly and outwardly as desired through movement of a single operating lever, but accidental movement of such doors to the outward position is entirely eliminated.

Other modes of applying the principles of the invention may be employed, change being made as regards the details described, provided the features stated in any of the following claims or the equivalent of such be employed.

We therefore, particularly point out and distinctly claim as our invention:

1. In a valve assembly, a housing having an inlet and outlet port and a pair of service ports, a plurality of passageways interconnecting said ports, valve means intersecting said passageways operative to establish fluid communication between said ports in a preselected manner, said valve means including a slave valve means operative to direct high pressure fluid entering the same to one of said service ports and establish fluid communication between said outlet port and the other of said service ports when disposed in a first operative position, and to direct said high pressure fluid to the other of said service ports and establish fluid communication between said outlet port and said one service port when disposed in a second operative position, lockout means mounted adjacent said slave valve means for movement to and from a lockout position in which said slave valve means is precluded from moving to said second operative position, and a pressurizing valve means operative to direct low pressure fluid from said inlet port through one passageway to said slave valve means and to direct high pressure fluid from said inlet port through a second passageway to said slave valve means, said slave valve means also being operative to direct said low pressure fluid to said one service port and to said outlet port through said pressurizing valve means, and to establish fluid communication between said other service port and said outlet port when disposed in said one operatve position.

2. The valve assembly of claim 1, wherein said valve means further includes manual valve means operative to establish fluid communication between said outlet port and the inner end of said slave valve means in a first operative position, and to establish fluid communication between said inlet port and said inner end in a second operative position.

3. The valve assembly of claim 2, further including a cam operative when rotated to move said manual valve means from one operative position to another.

4. The valve assembly of claim 3, including a lever mechanism operatively interconnecting said cam and lockout means in such a manner that movement of said lever mechanism in one direction rotates said cam to move said manual valve means from said first operative position to said second operative position and moves said lockout means out of said lockout position.

5. The valve assembly of claim 1, further including a bypass valve means and solenoid valve means in series in fluid communication with said inlet port, said bypass valve means being operative to preclude a build up of pressure at said inlet port when said solenoid valve means is open, and operative to allow a build up of pressure when said solenoid valve means is closed.

6. The valve assembly of claim 5, including a pressure relief valve operative to limit the maximum pressure in said valve assembly when said solenoid valve is closed.

7. The valve assembly of claim 1, including a pressure switch in fluid communication with said second passageway between said pressurizing valve means and said slave valve means, said pressure switch being adapted to indicate when a predetermined level of fluid pressure is available in said second passageway.

8. The valve assembly of claim 7, wherein said pressure switch includes a plunger means operative to engage and move a contact arm to close and thus complete an electrical indicating circuit when said predetermined level of fluid pressure is reached.

9. The valve assembly of claim 1, including a cooler port and flow regulator means in said housing, said flow regulator means being operative to direct return fluid away from said outlet port to said cooler port until a predetermined amount of return fluid flow is reached, above which said flow regulator means is operative to direct the excess return fluid to said outlet port.

10. The valve assembly of claim 2, including a check valve disposed in a fluid passageway interconnecting said inlet port and said manual valve means operative to prevent a sudden drop in pressure adjacent said inner end of said slave valve means when said manual valve means is in the third operative position should there be a momentary drop of fluid pressure at said inlet port.

11. A valve assembly for use in actuating a thrust reverser assembly and the like, comprising a housing having an inlet and outlet port and a pair of service ports; a plurality of passageways interconnecting said ports; a slave valve means operative to direct high pressure fluid to one of said service ports and establish fluid communication between said outlet port and the other of said service ports through said passageways when said slave valve means is in a first operative position and to direct said high pressure fluid to the other of said service ports and establish fluid communication between said outlet port and said one service port through said passageways when said slave valve means is in a second operative position, said slave valve means including a sleeve member having a plurality of radial apertures extending therethrough in fluid communication with a high pressure port, a piston slidably received in said sleeve member, said piston being urged axially inwardly to said first operative position by means of a compression spring, a hollow sleeve disposed in a bore in said piston, said piston bore being counterbored adjacent the inner end thereof for receiving the head of said hollow sleeve, a poppet valve slidably received within said hollow sleeve and having a head portion for engagement with a seat portion in said hollow sleeve, said poppet valve having radial apertures extending therethrough axially outwardly of said seat portion, and spring means disposed between said hollow sleeve head and said poppet valve head for yieldingly urging said poppet valve head against said seat portion; manual valve means operative to establish fluid communication between said outlet port and the inner end of said slave valve piston when disposed in a first operative position, and to establish fluid communication between said inlet port and said inner end when disposed in a second operative position; lockout means mounted adjacent said slave valve means for movement to and from a lockout position in which said poppet valve is locked in position, whereby fluid pressure adjacent the inner end of said piston will urge said pistons and said hollow sleeve axially outwardly to cause said seat portion to move away from said poppet valve and allow fluid to flow through said piston to said outlet port, thus precluding a sufficient build up of pressure adjacent said piston for urging the same to said second operative position; and means for controlling the amount of fluid pressure available to said slave valve means.

12. The valve assembly of claim 11, wherein said manual valve means includes a pair of manual valves, each of said manual valves having a pair of axially spaced ports and a spring-biased piston for yieldingly blocking fluid communication between said ports; said first operative position of said valve means being effected by establishing fluid communication between the ports of one of said manual valves and blocking fluid communication between the ports of said other manual valve; and said second operative position being effected by establishing fluid communication between the ports of said other manual valve and blocking fluid communication between the ports of said one manual valve.

13. The valve assembly of claim 12, further including a cam operative when rotated to move said manual valve means from one operative position to another.

14. The valve assembly of claim 13, including a lever mechanism operatively interconnecting said cam and lockout means in such a manner that movement of said lever mechanism in one direction rotates said cam to move said manual valve means from said first operative position to said second operative position and simultaneously moves said lockout means out of said lockout position.

15. The valve assembly of claim 11, wherein said means for controlling the amount of fluid pressure available to said slave valve means includes a bypass valve means and solenoid valve means in series in fluid communication with said inlet port, said bypass valve means being operative to preclude a build up of pressure at said inlet port when said solenoid valve means is open, and operative to allow a build up of pressure when said solenoid valve means is closed.

16. The valve assembly of claim 11, wherein said valve means further includes a pressurizing valve means operative to direct low pressure fluid from said inlet port through one passageway to said slave valve means and to direct high pressure fluid from said inlet port through a second passageway to said slave valve means, said slave valve means also being operative to direct said low pressure fluid to said one service port and to said outlet port through said pressurizing valve means, and to establish fluid communication between said other service port and said outlet port when disposed in said one operative position.

17. The valve assembly of claim 11, further including a flow regulator means disposed in a passageway between said one service port and an actuator operative to permit unrestricted flow of fluid from said slave valve means to said actuator, but to restrict the amount of fluid flow in the opposite direction.

18. The valve assembly of claim 1 wherein said pressurizing valve means comprises a hollow sleeve, a plurality of longitudinally spaced apertures in said hollow sleeve in fluid communication with a plurality of longitudinally spaced fluid ports, a spool valve means reciprocably mounted within said hollow sleeve, said spool valve means being operative to establish fluid communication between the interior of said spool valve means and one of said ports when disposed in a first operative position, and being operative to estabilsh fluid communication between the interior of said spool valve and a second port when disposed in a second operative position, and a positive seat means on said hollow sleeve which is adapted to be engaged by said spool valve means when said spool valve means is in either said first or said second operative positions.

19. In a valve assembly, a housing having an inlet and outlet port and a pair of service ports, a plurality of passageways interconnecting said ports, valve means intersecting said passageways operative to establish fluid communication between said ports in a preselected manner, said valve means including a slave valve means operative to direct high pressure fluid entering the same to one of said service ports and establish fluid communication between said outlet port and the other of said service ports when disposed in a first operative position, and to direct said high pressure fluid to the other of said service ports and establish fluid communication between said outlet port and said one service port when disposed in a second operative position, lockout means mounted adjacent said slave valve means for movement to and from a lockout position in which said slave valve means is precluded from moving to said second operative position, and a flow regulator means disposed in a passageway between said one service port and an actuator operative to permit unrestricted flow of fluid from said slave valve means to said actuator but to restrict the amount of fluid flow in the opposite direction.

20. In a valve assembly, a housing having an inlet and outlet port and a pair of service ports, a plurality of passageways interconnecting said ports, valve means intersecting said passageways operative to establish fluid communication between said ports in a preselected manner, said valve means including a slave valve means operative to direct high pressure fluid entering the same to one of said service ports and establish fluid communication between said outlet port and the other of said service ports when disposed in a first operative position, and to direct said high pressure fluid to the other of said service ports and establish fluid communication between said outlet port and said one service port when disposed in a second operative position, lockout means mounted adjacent said slave valve means for movement to and from a lockout position in which said slave valve means is precluded from moving to said second operative position, said slave valve means comprising a sleeve member in which there are provided a plurailty of longitudinally spaced apertures in fluid communication with said ports, a hollow spool valve disposed within said sleeve member for reciprocating movement therein, said hollow spool valve being provided with a plurality of groove and land means operative to direct said high pressure fluid entering the same to one of said service ports and establish fluid communication between said outlet port and the other of said service ports through said hollow spool valve when disposed in a first operative position, and to direct said high pressure fluid to the other of said service ports and establish fluid communication between said outlet port and said one service port through said hollow spool valve when disposed in a second operative position.

21. A pressurizing valve comprising a hollow sleeve, a plurality of longitudinally spaced apertures in said hollow sleeve in fluid communication with a plurality of longitudinally spaced fluid ports, a spool valve means reciprocably mounted within said hollow sleeve, said spool valve means being operative to establish fluid communication between the interior of said spool valve means and one of said ports when disposed in a first operative position, and being operative to establish fluid communication between the interior of said spool valve means and another of said ports when disposed in a second operative position, and a positive seat means on said hollow sleeve which is adapted to be engaged by said spool valve means when said spool valve means is disposed in either said first or said second operative positions, said seat means comprising an annular shoulder projecting radially inwardly from said hollow sleeve, said annular shoulder being adapted to extend into an annular groove provided on said spool valve means.

22. The pressurizing valve of claim 21 wherein said annular groove on said spool valve means is provided with outwardly tapered edges, one of said tapered edges being adapted to be engaged by and form a seal with the adjacent edge of said annular shoulder when said spool valve means is disposed in said first operative position, and the other of said tapered edges being adapted to be engaged by and form a seal with the adjacent edge of said annular shoulder when said spool valve means is disposed in said second operative position, whereby fluid leakage from said pressurizing valve is maintained at a minimum level when said valve is in either of said operative positions.

References Cited

UNITED STATES PATENTS

| | | | |
|---|---|---|---|
| 2,312,432 | 3/1943 | Mercier | 137—596 |
| 2,500,758 | 3/1950 | Kupiec | 137—596.13 |
| 2,608,824 | 9/1952 | Kirkham | 137—596.12 XR |
| 2,927,801 | 3/1960 | Jackson | 137—596 XR |
| 2,970,611 | 2/1961 | Hoge | 137—596.16 |
| 2,981,287 | 4/1961 | Caslow | 137—625.64 |

FOREIGN PATENTS 615,008  1/1961  Italy.

M. CARY NELSON, *Primary Examiner.*

R. J. MILLER, *Assistant Examiner.*